INVENTORS:
RICHARD J. BOX
JOHN S. STEWART

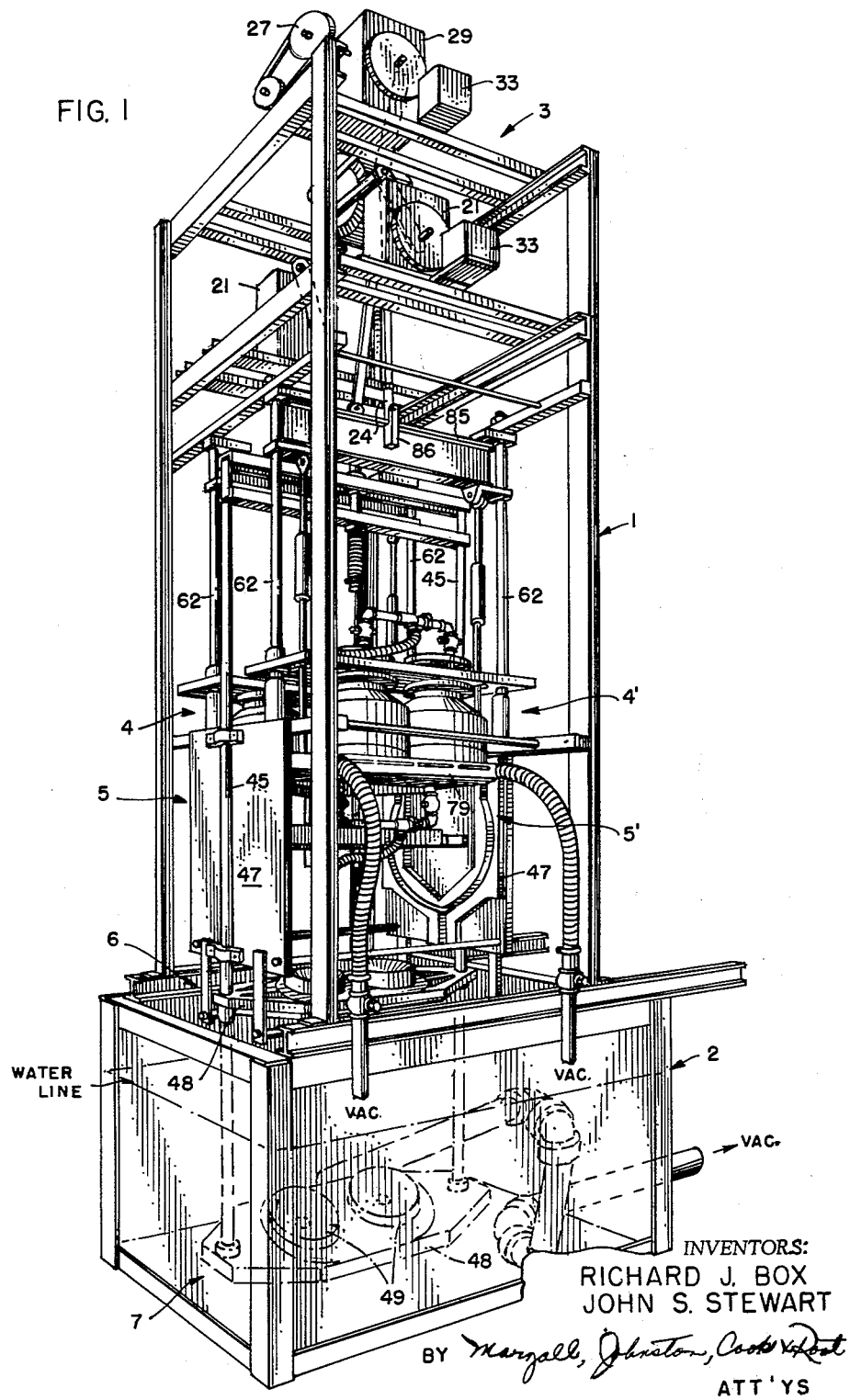

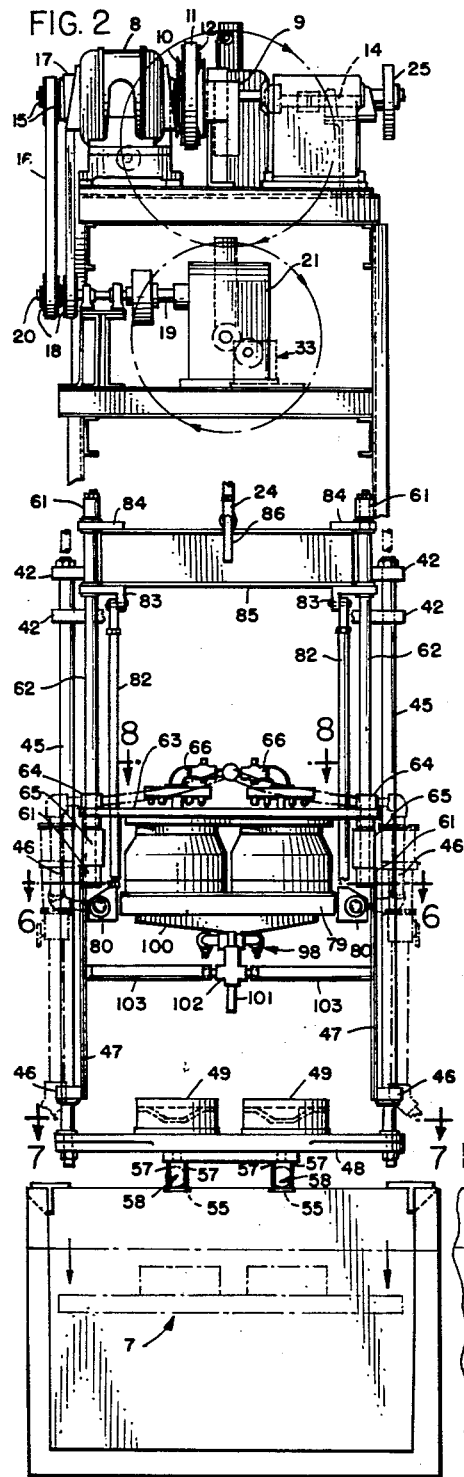
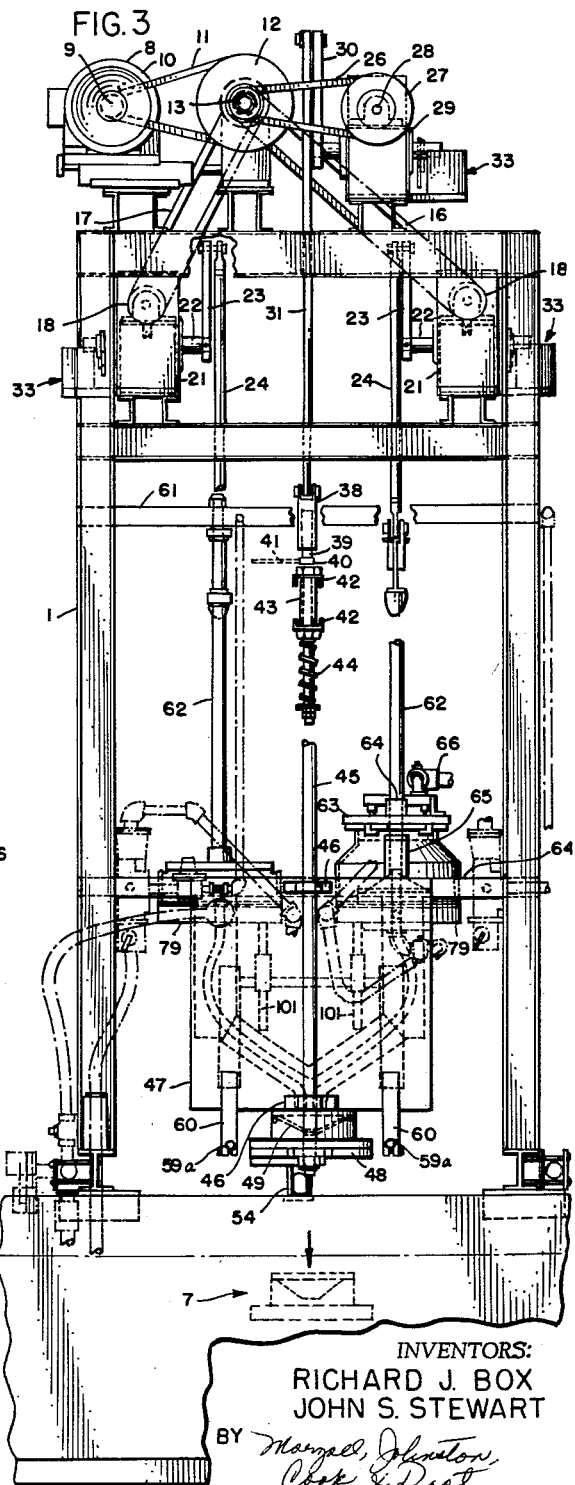
INVENTORS:
RICHARD J. BOX
JOHN S. STEWART

ATT'YS

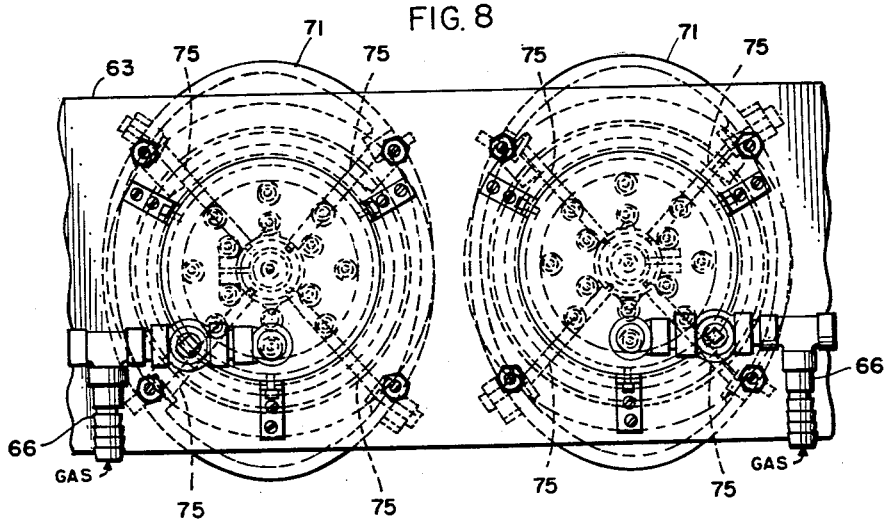
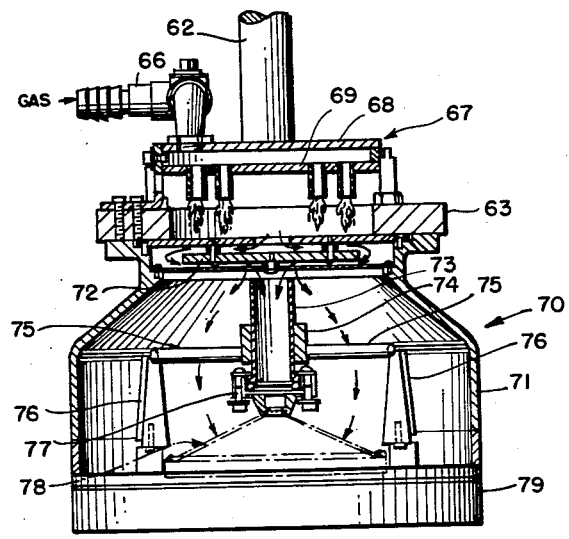

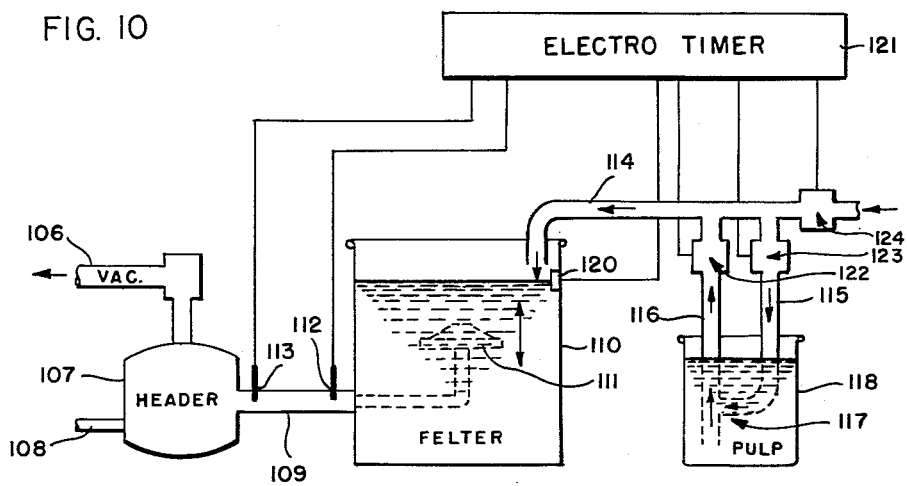
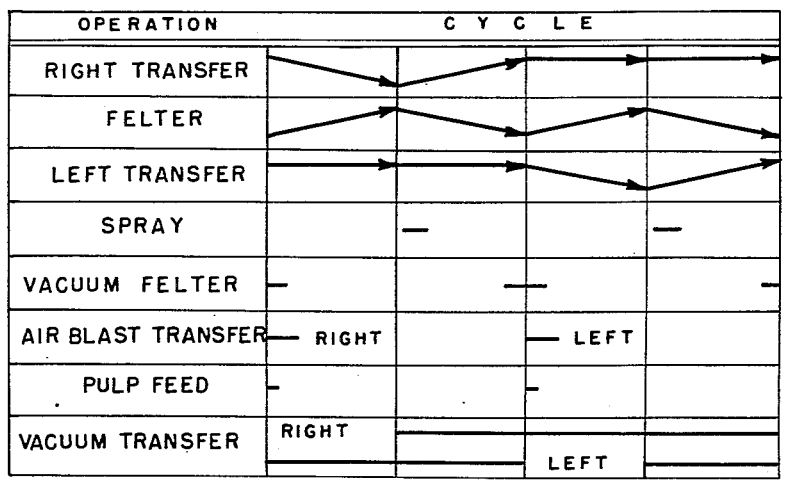
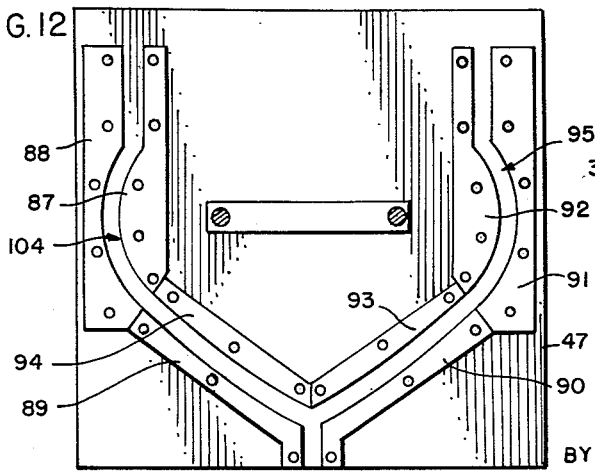
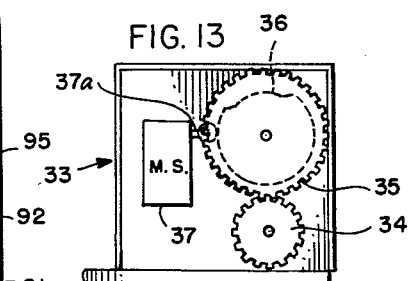
INVENTORS:
RICHARD J. BOX
JOHN S. STEWART 3,152,036
AUTOMATIC FELTING MACHINE AND CONSISTENCY CONTROL APPARATUS THEREFOR
Richard J. Box and John S. Stewart, St. Charles, Ill., assignors to Hawley Products Company, St. Charles, Ill., a corporation of Delaware
Filed Oct. 10, 1962, Ser. No. 229,550
4 Claims. (Cl. 162—258)

This invention relates to a machine for the manufacture of felted bodies, such as cones and the like, from fiber slurries, and particularly to an automatic machine for the manufacture of same.

Machines for felting cones and the like from fiber slurries are already known. Typically, a porous die is immersed in the fiber slurry and vacuum applied. The fiber is set onto the die, forming a fiber cone. The die is then raised out of the slurry. Machines are also known for drying the cones so felted. However, it has heretofore been necessary that the cones be manually transferred from the felter to the dryer.

It is an object of this invention to provide an automatic machine for the manufacture of cones and the like from fiber slurry.

It is also an object of this invention to provide a machine for the manufacture of fiber cones and the like which eliminates the need for manual transfer during the manufacturing operation.

A further object is to provide an automatic machine of the character described featuring a device which automatically controls the weight of the cones so produced.

Yet another object is to provide an automatic cone machine adaptable to be used with heated die drying.

A still further object of this invention is to provide an automatic cone machine adaptable to be used with male felting dies or female felting dies.

In the drawings:

FIG. 1 is a perspective of an exemplary machine showing the interrelation of its various component assemblies;

FIG. 2 is a fragmentary front elevation of the machine of FIG. 1;

FIG. 3 is a fragmentary side elevation of the machine of FIG. 2;

FIG. 8 is a section taken along section 8—8 of FIG. 2;

FIG. 9 is a sectional view of the drying assembly;

FIG. 10 is a schematic representation of an automatic fiber feed system;

FIG. 11 is a chart showing the integrated functioning of the various assemblies comprising the machine;

FIG. 12 is a detailed view of the cam plate of the transfer assembly; and

FIG. 13 is a view of the mechanism for timing the operation of the transfer assemblies.

Figure 4:
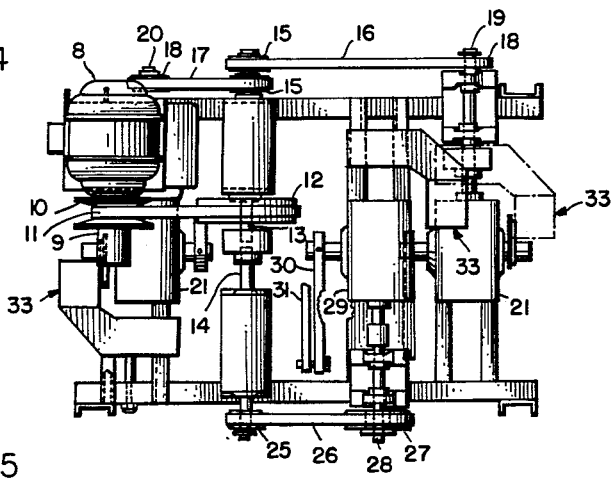
FIG. 4 is a top plan view of the machine of FIG. 3.

The present invention concerns an automatic machine for making molded fiber cones and the like. In broad form, it comprises means for felting such bodies from a water slurry of fiber and the like, means for drying said bodies, means for transferring said bodies from said felting means to said drying means, and means for ejecting said bodies from said drying means. In preferred form, the machine comprises a plurality of drying means and a plurality of transfer means whereby the drying time is substantially longer than the felting time. For example, where two transfer assemblies and two drying assemblies are provided for each felting assembly, the cycle may occur as follows:

(1) A first cone is felted.

(2) Transfer assembly A conveys the first cone to drying assembly A.

(3) A second cone is felted.

(4) Transfer assembly B conveys the second cone to drying assembly B.

(5) The dried, first cone is ejected.

(6) A third cone is felted.

(7) The third cone is conveyed to drying assembly A by transfer assembly A.

(8) The dried, second cone is ejected.

It is, further, desirable to provide an automatic machine of the type described with a device for automatically controlling the consistency of the fiber slurry, and, hence, controlling the weight of the cones produced. This is accomplished by providing an apparatus that controls the feeding of fiber into the slurry.

Referring more specifically to the drawings, FIG. 1 showing an upstanding frame 1 mounted on a slurry tank 2. On the topmost part of frame 1 is mounted the driving and synchronizing assembly 3. Centrally located on frame 1 are two drying assemblies 4 and 4'. Immediately thereunder are two transfer assemblies 5 and 5'. At the bottom of the frame 1 is the felting assembly 6, which is also shown in phantom lines to illustrate its position 7 when immersed in tank 2.

Driving and synchronizing assembly 3 is shown in FIGS. 2, 3 and 4. Motor 8, via its drive shaft 9, pulley 10, belt 11 and pulley 12, drives countershafts 13 and 14. Countershaft 13, by means of pulleys 15, belts 16 and 17, pulleys 18, and shafts 19 and 20, transmits power to clutch-speed reducers 21. Clutch-speed reducers 21, via shafts 22, drive transfer crank arms 23. Transfer crank arms 23 are journalled with transfer connecting arms 24.

Countershaft 14, by means of pulley 25, belt 26, pulley 27 and shaft 28, drives clutch-speed reducer 29, which drives felter crank arm 30. Felter crank arm 30 is journalled with felter connecting arm 31.

The sequence of operation is controlled by electric timers 33. FIG. 13 is an enlarged view showing timer 33. In it, a gear 34 drives gear 35, which drives a series of cams 36 (only one cam being shown in FIG. 13). Each cam operates a follower 37a to open or close a microswitch 37. Microswitches 37, in turn, activate or deactivate electrical circuits as follows:

The felter crank arm 30 rotates continuously so that the felter mechanism is in continuous reciprocal motion. The timer 33, which is driven by the speed reducer 29, has a drive gear 35 (FIG. 13) driven by the gear 34 on the output side of the speed reducer at one-half the rate of rotation of the crank arm 30. The gear 35 drives cams 36. The cammed surface of cams 36 moves cam followers 37a of microswitches 37. The microswitches 37, in turn, cause the electromagnetic clutches and associated brake mechanisms of the clutch-speed reducers 21 for the transfer mechanism drives to activate and deactivate the reciprocal drive imparted to the rods 24 by crank arms 23 at the proper intervals during a cycle of operation of the machine in accord with the timing diagram of FIG. 11.

The timers 33 on the transfer mechanism clutch-speed reducers 21 are driven by the output side of the clutch-speed reducers. Their respective cams 36 operate microswitches 37 in electrical circuits (not shown) by which the vacuum system for the transfer dies and air blast system for ejecting the dried, felted bodies are activated during the proper intervals in the cycle of movement of each transfer die in accord with the timing shown in the diagram of FIG. 11. These timers may also have cam operated switches in electrical circuits (not shown) for opening the main gas lines to dryers 67 so that the main burners of the dryers operate only when a felted body is positioned therein by the transfer assembly.

The timer 33 driven by clutch-speed reducer 29 also has a cam 36 operating a microswitch 37 in an electrical circuit (not shown) by which the vacuum system for the felter mechanism is activated and deactivated at the intervals shown in the diagram of FIG. 11.

Felter assemblies 6 and 6' are illustrated in FIGS. 2, 3, 5 and 7. Felter connecting arm 31 is journalled with adjusting yoke 38. Inserted in yoke 38 is rod 39, which passes through collar 40 with handle 41. Mounted on rod 39 are felter cross arms 42, which are separated by spacer 43. Cross arms 42 separated by spacer 43 are seated against spring 44. At each end of cross arms 42 is attached a felter rod 45. Felter rods 45 slidably pass through bearing brackets 46, mounted on cam plates 47.

Felter plate 48 is attached at the bottom of rods 45. Removably mounted on plate 48 are dies 49. Plate 48 has a tube 50 to be connected by flexible tubing to a vacuum source. Cut in plate 48 are a series of channels 51 which act as the vacuum manifold for the dies 49. Fine adjustment is obtained with large needle valves 52 and small needle valves 53. On the underside of plate 48 are valves 54 comprising ball seats 56 against which are seated floating ball valves 58 when the plate 48 is immersed. The ball valves 58 are held in cages comprising lower plates 55 and supporting rods 57. Vacuum can be drawn on the felter dies only when ball valves 58 are immersed so as to be floated against ball seats 56.

The ball valves are auxiliary to the vacuum system operated by timer 33 on speed reducer 29 in that the vacuum system can be or can remain activated before or after the ball valves are immersed in the slurry. This allows the system to be cleared of water or slurry in the vacuum lines when the ball valves are open. Also, the opening of the ball valves after the plate has risen from the slurry aids in bringing the interior of the felter plate 48 quickly to atmospheric pressure so that the wet, felted body can be readily transferred to its respective transfer die by the application of vacuum to the latter.

In the drawings, the felter assembly is shown in the "up" position 6, with the "down" position 7 being shown in phantom. In operation, by means of the driving assembly 3, felter connecting arm 31 moves up and down, imparting similar motion to felter cross arms 42, felter rods 45 and felter plate 48. Thus, the felter plate moves cyclically up and down, in and out of slurry tank 2. As the assembly moves from the "up" to the "down" position, the dies 49 are washed with a water spray from jets 59 on pipes 59a which are mounted on cam plates 47 by brackets 60.

Two drying assemblies 4 and 4' are provided as shown in FIGS. 2, 3, 5, 8 and 9. Attached to frame 1 are horizontal support bars 61. Vertical support rods 62 are secured therebetween. Dryer plates 63 are slidably mounted on rods 62 by means of collars 64, and are held above the level of lower horizontal support bars 61 by spacers 65.

The drying mechanism is shown in greater detail in FIGS. 8 and 9. It should be noted that in FIG. 3 portions of left hand dryer assembly are not shown. Each drying mechanism features a gas line 66, attached at the top of the assembly, to a burner 67. Burner 67 is attached to plate 63, the burner comprising a burner housing 68 and a burner manifold 69. Mounted below plate 63 is a drying oven 70 comprising an oven housing 71, baffle plate 72 and central column 73. Column 73 is held in place by collar 74, which is held by rods 75 and rod supports 76. At the bottom of column 73 brackets 77 are provided for mounting a heated die, if desired. However, in FIG. 9, the die 78 shown is a transfer die mounted on transfer plate 79 and is not attached to brackets 77, but is mounted on transfer plate 79. Die 78 and plate 79 are shown in FIG. 9 for the purpose of illustrating the interrelation of dryer assembly 4 and the transfer assembly 5.

A feature of the invention resides in the transfer assemblies 5 and 5', to be described immediately below. These assemblies are the mechanisms that automatically remove the molded fiber bodies from the felter and convey them to the dryer.

Two transfer assemblies 5 and 5' are provided, one in conjunction with each of the drying assemblies 4 and 4', as shown in FIGS. 2, 3, 5, 6 and 12. The transfer assemblies feature transfer plates 79, with foraminous transfer dies 78 mounted thereon. At each end of plates 79 are end housing castings 80 with cam followers 81. Extending vertically upward from castings 80 are actuating arms 82 which are journalled with brackets 83, which are adapted to slide along support rods 62. Transfer cross beam 85 is attached to brackets 83 and to other brackets 84, which are adapted to slide along support rods 62. Centrally affixed to beams 85 are mounting plates 86, to which are pinned transfer connecting arms 24.

Cam followers 81 ride in channels 95 and 104 of cam plate 47. The grooves are formed by cams 87, 88, 89, 90, 91, 92, 93 and 94 mounted on plate 47. FIG. 12 shows how the cams are positioned to form channels 95 and 104. The cam followers 81 of the first transfer assembly move in the right hand channels 95, while the cam followers 81 of the second transfer assembly move in the left hand channels 104.

Lines 96 for supplying alternately vacuum and air under pressure are provided at each end housing casting 80. Through the body of plates 79 the vacuum or pressurized air is distributed to the dies 78 at points 97. Gas supplies 98 and burners 99 are provided under plates 79 for heating dies 78.

Pivot castings 100 are attached to the bottom side of plate 79. Pivot guide posts 101 extend from castings 100 and pass slidably through pivots 102. Pivots 102 rotate about pivot rods 103 which are anchored at cam plates 47.

Thus, when drive assembly 3 actuates the connecting arm 24 of one transfer assembly 5, cross beam 85 slides down the support rods 62 on the brackets 83 and 84. This imparts downward motion to actuating arms 82 which, in turn, move plate 79 downward with cam followers 81 sliding along channels 95. Transfer plate 79 is anchored to pivot 102. Thus, as cam followers 81 slide down channels 95, plate 79 gradually is inverted, pivot 102 rotating about pivot rods 103, and pivot guide post 101 sliding through the pivot. Where cam followers 81 reach the bottom of channels 95, plate 79 is completely inverted. The cam followers 81, and, hence, plate 79, then proceed to the extreme lower portion of the channels 95, where the transfer operation is begun, as is hereinafter explained.

In operation, the felter plate 48 is constantly in motion, moving up and down. While the felter is in its lower position 7, vacuum is applied and fiber is sucked onto the felter die 49 for a short period of time, forming a molded fiber body. As the felter plate 48 starts its upward movement, vacuum is cut off. At this point, one transfer assembly 5 is actuated and the plate 79 begins its downward movement and is inverted as has hereinbefore been explained. At the instant felter plate 48 reaches its highest point (as in FIG. 5), transfer plate 79 reaches its lowest point. At this point, the vacuum is applied through transfer plate 79 and the molded fiber body is held against die 78 on plate 79. Transfer plate 79 is then raised and felter plate 48 is lowered into the slurry. As transfer plate 79 is raised, it is again inverted so that die 78 with the molded filter body thereon is on the top side. The die and fiber body are pushed up inside oven housing 71 of drying assembly 4. Transfer plate 79 contacts oven housing 71 around its lower edge and the dryer assembly is raised, dryer plate 63 sliding a short distance up support rods 62.

The fiber body is dried by pulling hot gases from burner 67 through the fiber body on die 78 and out the vacuum system. The fact that the dryer assembly was raised along support bars 62 means that it is resting on transfer plate 79. Thus, it is insured that only the hot gases from burner 67 will be drawn through the fiber body in die 78. Cool air from outside can not enter oven housing 71 as it is resting tightly no plate 79.

Meanwhile, felter plate 48 has been lowered into the slurry and the felting process is repeated. As the plate is again raised, transfer assembly 5′ is actuated. Plate 79 is lowered and inverted. When plate 48 is at its highest point and plate 79 simultaneously at its lowest point, vacuum is supplied to plate 79 and the second molded fiber body is transferred from die 49 to die 78, whereupon felter plate 48 is lowered into the slurry and transfer plate 79 is raised and inverted and the fiber body dried as hereinbefore described. The cycle is continued, with the drying period being roughly twice as long as the felting period, there being two dryer assemblies and two transfer assemblies and only one felting assembly.

Figure 5:
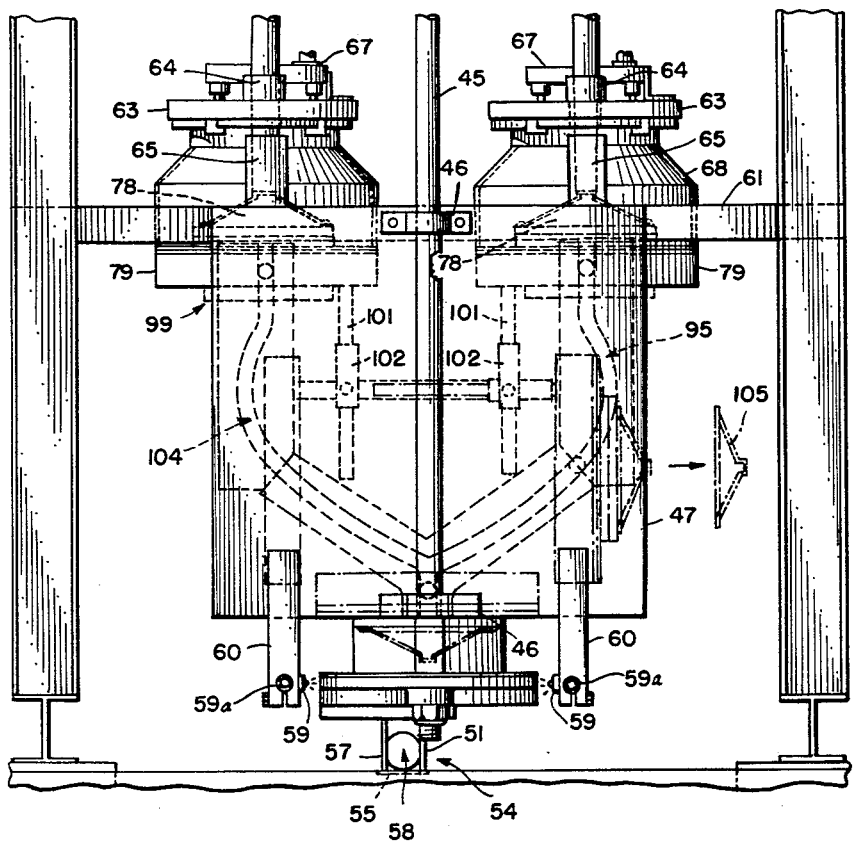
FIG. 5 is a fragmentary, detailed view showing the transfer assembly of the machine in its various positions.
Figure 6:
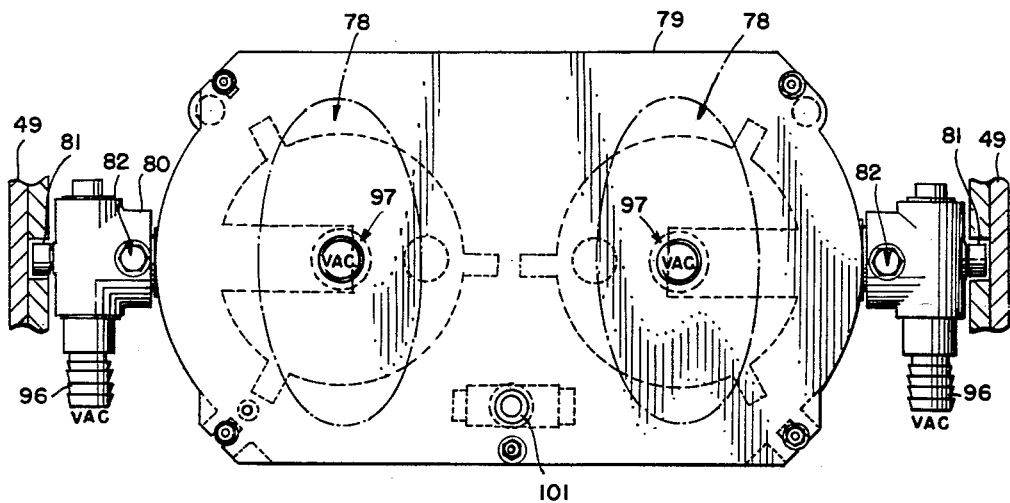
FIG. 6 is a section taken along section 6—6 of FIG. 2.
Figure 7:
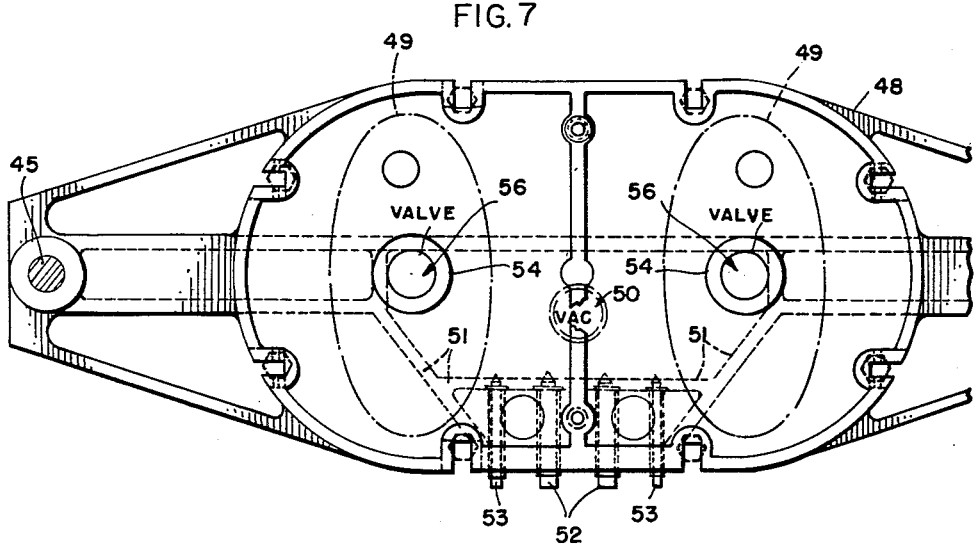
FIG. 7 is a section taken along section 7—7 of FIG. 2.

The molded fiber bodies are ejected as is indicated in FIG. 5. As the transfer plate 79 is lowered and inverted, the vacuum is cut off to plate 79, and the fiber body 105 is blown off to the side.

FIG. 11 shows the sequential relation of the separate parts of the operation cycle. In the column entitled "Operation" are listed the various phases of the operation cycle. In the four columns under the main heading entitled "Cycle" are shown the relative operational states of the various phases throughout the four quarters of the operation cycle.

In the horizontal row of the chart entitled "Right Transfer" is shown the relative position of right transfer assembly 5 during the four quarters of the cycle. Thus, it is seen that during the first quarter right transfer assembly is descending; during the second quarter right transfer assembly is ascending; and during the final two quarters right transfer assembly is in the "up" position.

The second horizontal row, entitled "Felter," shows the cyclical up and down motion of felter assembly 6. It should be noted that felter assembly 6 completes two up and down cycles for each one up and down cycle of a transfer assembly.

The third horizontal row, entitled "Left Transfer," is similar to the row showing the operation of the right transfer assembly, the only difference being that the descent and ascent of the assembly is phased differently.

The row entitled "Spray" shows the times throughout the cycle at which water is sprayed through jets 59 to cleanse felter die 49.

"Vacuum Felter" indicates the period throughout the operation cycle during which vacuum is applied through felting dies 49.

"Air Blast Transfer" indicates the times when compressed air is blown back through transfer plate 79 to eject a dried, molded fiber cone. The terms "right" and "left" indicate through which transfer assembly the compressed air is being applied.

"Pulp Feed" indicates those times during the operation cycle during which pulp is being fed into slurry tank 2 to replenish and to maintain the fiber consistency.

"Vacuum Transfer," "Right" and "Left," indicates those periods of time throughout the operation cycle during which vacuum is being applied through the respective transfer assemblies.

It is desirable to use an automatic system to control the consistency of the fiber slurry, and to replenish the fiber as it is removed from the slurry by the felting process. FIG. 10 is a schematic diagram of one such system. Vacuum line 106 passes from the vacuum source to vacuum header 107, equipped with drain 108. Vacuum line 109 runs from header 107 through a slurry tank 110 and attaches flexibility to a felter 111 adapted to be raised and lowered. Sensor probes 112 and 113 are placed in vacuum line 109. Water pipe 114 passes through water valve 124 and into tank 110. Dilution pipe 115 branches off water pipe 114 and communicates with the fiber feed pipe 116 at joint 117. Dilution pipe 115 passes through dilution valve 123. Fiber feed pipe 116 is open ended, the open end being immersed in pulp tank 118. Flow of water and fiber through pipe 116 is controlled by fiber flow valve 122. A water level sensor 120 is provided in tank 110.

Water flowing through pipe 114 results in a reduced pressure in fiber feed pipe 116, thus sucking fiber out of tank 118 and into pipe 114, through which it is carried to slurry tank 110.

The operation of the system is based on the principle that a constant weight of fiber felted in a constant time from a constant slurry of constant consistency (percent fiber in the slurry) and constant freeness (a measure of resistance to water flow through the felt under vacuum) will result in water reaching a point or points in the vacuum system at the same time on each successive cycle.

It is necessary to dilute the fiber from tank 118 so as to get accurate control over the amount of fiber introduced into slurry tank 110. It is desirable to introduce a small amount of fiber after each felting operation. Each felted fiber body will have a weight of the order of magnitude of a few grams, so that the weight of fiber introduced after each cycle will be but a few grams also. Thus, in order that the fiber flow valve 122 be open for a reasonable length of time, it is necessary to dilute the fiber.

The fiber feed cycle is coordinated with the felting operation so that replenishment occurs during the felting operation. The fiber feed is usually set to begin when the vacuum to the felter is turned on (see FIG. 11). The fiber flow valve 122 is open for a set, constant period of time. It is preferred to keep it open from about 0.5 to 5.0 seconds. Dilution valve 123 is open for a variable length of time, which is shorter than the time valve 122 is open. Water valve 124 is open for a variable length of time determined by a level sensor 120 in tank 110.

In practice, at the beginning of each felting cycle, valves 122, 123 and 124 are simultaneously opened. As long as dilution valve 123 is open, only a minimal amount of fiber is drawn through pipe 116. Dilution valve 123 then closes and fiber is drawn up pipe 116 until fiber flow valve 122 closes at the end of the fixed period of time. Valve 124 remains open and water flows until the level in tank 110 reaches the level of sensor 120. Thus, the amount of fiber introduced is inversely proportional to the time valve 123 is left open. The longer valve 123 is left open, the smaller the amount of fiber that is fed into the slurry tank 110. The shorter the time valve 123 is open, the more pulp is fed.

The length of time valve 123 is to be left open depends upon the rate of flow of water in line 109. As hereinbefore explained, the principle upon which this system is based is that a constant weight of fiber, felted in a constant time, from a slurry of consistency and constant freeness, will result in water reaching the vacuum header at the same time on successive cycles. However, if the slurry is too dense and the felted fiber body thus too heavy, the water takes longer to pass through the fiber body and, hence, travels at a slower rate through vacuum line 109. Conversely, if the slurry is too thin, and the felted body thus too light, water passes through easily and travels at a faster rate. In response to the measurement of rates which water passes through line 109, the electrotimer 121 controls valve 123. If the water flow rate in line 109 is too high, valve 123 is opened for a shorter period of time and more fiber is supplied to tank 110. If the water rate is too slow in line 109, then valve 123 is opened for a longer than normal time and a smaller amount of fiber is supplied to slurry tank 110.

The system may be operated using two probes 112 and 113 or only one probe 112. Using the two probe system, the time is measured that it takes water to pass from the first probe 112 to the second probe 113. Although this is an absolute measurement of time, it is suitable for a rate determination, since the distance between probes 112 and 113 is fixed.

Alternatively, a one probe system may be used. Under this modification, a fixed point of time reference is used, usually the time when the felter vacuum is switched on. The time is measured from this point of reference until water reaches the single probe. Again, this is suitable for use as a rate measurement, since the distance between probe 112 and the die 78 is constant. The second modification (one probe system) is to be preferred because of the greater simplicity involved in a one probe system.

An automatic fiber feed has thus been provided which will accurately detect variation in slurry consistency and which will control fiber feed so as to bring the consistency back to the standard value. Using this system, molded fiber bodies are obtained having greater uniformity both in weight and configuration. The only variable that can not be totally fixed is freeness, but this variable change is only with the introduction of new batches of fiber. In the production of typical fiber bodies, a batch of fiber may last several days so that the freeness variable is in effect constant.

Normally, felting dies 49 are female in nature; thus, transfer dies 78 are male dies. However, male felting dies can be utilized, with the corresponding transfer dies then being female.

In addition to the drying process hereinbefore described (drying molded fiber bodies by drawing hot gases through the fiber body by the application of vacuum), substitution of superheated steam drying or heated die drying is also possible. According to the latter procedure, electrically heated, steam heated or gas heated drying dies are mounted on bracket 77 within oven housing 71. Water vapor is drawn by vacuum out of the molded fiber body through one or both dies. Thus, in operation, the molded fiber body is dried between the two dies. Usually, transfer dies 78 are male dies so that the drying dies are female in nature. However, this is not crucial, and they can be reversed so that transfer dies 78 are female and the drying dies are male. It is only important that both the drying dies and felting dies 49 be the same.

The present invention is a newly designed machine for the automatic production of fiber cones and the like from water slurry. In particular, the novel transfer assemblies obviate the need for a manual transfer from the felting assembly to the drying assembly. This makes 24 hour a day operation feasible and, furthermore, has added advantages of reduction of space and equipment requirements.

Additionally, the use of the present invention has the advantage of producing superior fiber cones. The cones so produced have greater uniformity and superior rim flatness as compared with those made on the prior manually operated machines. Also, the use of the machine in conjunction with an automatic fiber feed system provides cones with greater reproducibility in weight.

The machine is quite flexible and is adaptable to be used with female felters or male felters. Also, heated die drying is possible on the machine with very little alteration.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. In an automatic felting machine, transfer means comprising a transfer plate with a cam follower thereon, a porous transfer die mounted on said transfer plate, drive means for imparting reciprocal vertical motion to said transfer plate, a cam plate with a camming channel therein, the cam follower on said transfer plate being slidably mounted in said channel, means mounting said transfer plate for coaction with said channel so that, when said drive means imparts a downward motion to said transfer plate, said transfer plate is inverted, and vacuum means for holding a felted body on said transfer die during the transfer step.

2. In an automatic machine for making felted bodies on a porous die, means for automatically controlling the consistency of a fiber slurry comprising a vacuum source connected to said porous die, means for measuring the rate at which liquid drawn from a fiber slurry through a felted body formed on said porous die flows toward said vacuum source, and means responsive to a signal from said means for measuring for varying the flow of fiber into said slurry, wherein the amount of replenishing slurry has a fiber content proportionate to said measured rate of flow.

3. An automatic machine for making felted bodies comprising a tank adapted to contain a slurry of fibers, felting means including a foraminous felting die on which a wet, felted body is formed in said tank, means for raising and lowering said felting means into and out of said tank, transfer means including a plurality of foraminous transfer dies, each transfer die having a substantially mating fit with said felting die, said transfer means including at least two transfer plates on which respective transfer dies are mounted, drive means for imparting vertical, reciprocal motion to said transfer plates to bring in sequence said transfer plates and transfer dies thereon into substantially mating fit of said transfer dies and said felting die each time said felting die rises out of said tank, pivot means mounting each transfer plate and transfer dies thereon for pivotal movement between an upwardly facing position of said transfer dies and a downwardly facing position thereof, and cam means for inverting said transfer plates and transfer dies thereon on said pivot means during said reciprocal motion of said transfer plates between downmost position wherein the respective transfer die is in said substantially mating fit with said felting die and an uppermost position, means for applying a vacuum to each transfer die for lifting out of said felting die and for holding on said transfer die a wet, felted body, a dryer above said tank and associated with each transfer die, said dryer having a housing opening downwardly, into which a wet, felted body is transferred in uppermost position of the transfer plate, and timed driving means operatively associated with each transfer die for stopping movement of the latter at its respective dryer for a time sufficient to dry said felted body on said transfer die.

4. An automatic machine as claimed in claim 3 wherein said cam means includes a cam plate with a camming channel therein, and a cam follower on said transfer plate.

References Cited in the file of this patent

UNITED STATES PATENTS

| | | |
|---|---|---|
| 1,600,731 | Hall | Sept. 21, 1926 |
| 1,621,147 | Winnertz | Mar. 15, 1927 |
| 2,006,831 | Hawley | July 2, 1935 |
| 2,038,721 | Desmond | Apr. 28, 1936 |
| 2,070,040 | Chapman | Feb. 9, 1937 |
| 2,437,715 | Throp et al. | Mar. 16, 1948 |
| 2,494,743 | Chaplin | Jan. 17, 1950 |
| 2,705,442 | Kyle et al. | Apr. 5, 1955 |
| 2,963,397 | McLeod | Dec. 6, 1960 |
| 2,969,835 | Young | Jan. 31, 1961 |